(12) United States Patent
Klingbeil et al.

(10) Patent No.: US 8,794,212 B2
(45) Date of Patent: Aug. 5, 2014

(54) ENGINE AND METHOD OF OPERATING ENGINE

(75) Inventors: Adam Edgar Klingbeil, Ballston Lake, NY (US); Roy James Primus, Niskayuna, NY (US); David James Walker, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 207 days.

(21) Appl. No.: 13/194,545

(22) Filed: Jul. 29, 2011

(65) Prior Publication Data

US 2013/0025573 A1 Jan. 31, 2013

(51) Int. Cl.
| | | |
|---|---|---|
| F02B 3/06 | (2006.01) | |
| F02M 25/00 | (2006.01) | |
| F02D 19/08 | (2006.01) | |
| F02D 19/06 | (2006.01) | |
| F02D 19/10 | (2006.01) | |
| F02D 41/00 | (2006.01) | |

(52) U.S. Cl.
CPC ............ *F02D 41/0027* (2013.01); *F02D 19/08* (2013.01); *F02D 19/0689* (2013.01); *F02D 19/0692* (2013.01); *F02D 19/081* (2013.01); *F02D 19/10* (2013.01); *F02D 19/0642* (2013.01)
USPC ........ 123/299; 123/27 GE; 123/525; 123/431

(58) Field of Classification Search
CPC ............ F02D 19/0642; F02D 19/0689; F02D 19/0692; F02D 19/08; F02D 19/081; F02D 19/10; F02D 41/0027; F02D 41/40; F02D 41/401; F02D 41/402
USPC ......... 123/25 C, 25 E, 25 F, 27 GE, 299, 300, 123/304, 305, 198 A, 525, 431, 575, 698, 123/90.15, 568.11; 701/103–105, 111
See application file for complete search history.

(56) References Cited

U.S. PATENT DOCUMENTS

| | | |
|---|---|---|
| 6,095,102 A | 8/2000 | Willi et al. |
| 6,598,584 B2 * | 7/2003 | Beck et al. ..................... 123/299 |

(Continued)

FOREIGN PATENT DOCUMENTS

| | | |
|---|---|---|
| DE | 102006048070 A1 | 3/2008 |
| EP | 1559887 A2 | 8/2005 |

(Continued)

OTHER PUBLICATIONS

R. G. Papagiannakis et al, "Combustion and exhaust emission characteristics of a dual fuel compression ignition engine operated with pilot Diesel fuel and natural gas," Energy Conversion & Management, vol. 45, pp. 2971-2987, Feb. 28, 2004.

(Continued)

*Primary Examiner* — Hai Huynh
(74) *Attorney, Agent, or Firm* — Joseph J. Christian

(57) ABSTRACT

A method of operating an engine comprises introducing into a cylinder volume a non-compression-combustible fuel, such as natural gas, a compression-combustible fuel, such as diesel, and an oxidant and mixing the components for greater than about 275 microseconds, prior to compression combusting the compression-combustible fuel. The mixing may be done such that the two fuels are at least partially homogenized in the cylinder volume. By mixing, or premixing, the two fuels prior to combustion, the compression-combustible fuel is then simultaneously combusted via compression at multiple ignition points in the volume. The second, non-compression-combustible fuel is ignited in response to the combustion of the first fuel. An engine that enables the various methods is also disclosed.

29 Claims, 5 Drawing Sheets

(56) References Cited

U.S. PATENT DOCUMENTS

| | | | |
|---|---|---|---|
| 6,640,773 B2 | 11/2003 | Ancimer et al. | |
| 6,666,185 B1* | 12/2003 | Willi et al. | 123/299 |
| 6,684,852 B2 | 2/2004 | Wright et al. | |
| 6,840,211 B2* | 1/2005 | Takahashi | 123/299 |
| 7,007,669 B1 | 3/2006 | Willi et al. | |
| 7,036,482 B2* | 5/2006 | Beck et al. | 123/229 |
| 7,051,701 B2* | 5/2006 | Tomita | 123/299 |
| 7,533,634 B2* | 5/2009 | Ritter et al. | 123/27 GE |
| 7,740,000 B2* | 6/2010 | He et al. | 123/299 |
| 8,322,325 B2* | 12/2012 | Rogak et al. | 123/304 |
| 2003/0024246 A1 | 2/2003 | Beck et al. | |
| 2003/0221661 A1 | 12/2003 | Willi et al. | |
| 2004/0134194 A1 | 7/2004 | Roby et al. | |
| 2011/0010074 A1* | 1/2011 | Hung et al. | 701/103 |
| 2012/0325180 A1* | 12/2012 | Montgomery | 123/299 |
| 2013/0104850 A1* | 5/2013 | Long et al. | 123/445 |

FOREIGN PATENT DOCUMENTS

| | | |
|---|---|---|
| WO | 2004029438 A1 | 4/2004 |
| WO | 2007115594 A1 | 10/2007 |

OTHER PUBLICATIONS

PCT Search Report and Written Opinion issued Mar. 5, 2013 in connection with corresponding PCT Patent Application No. PCT/US2012/046337.

* cited by examiner

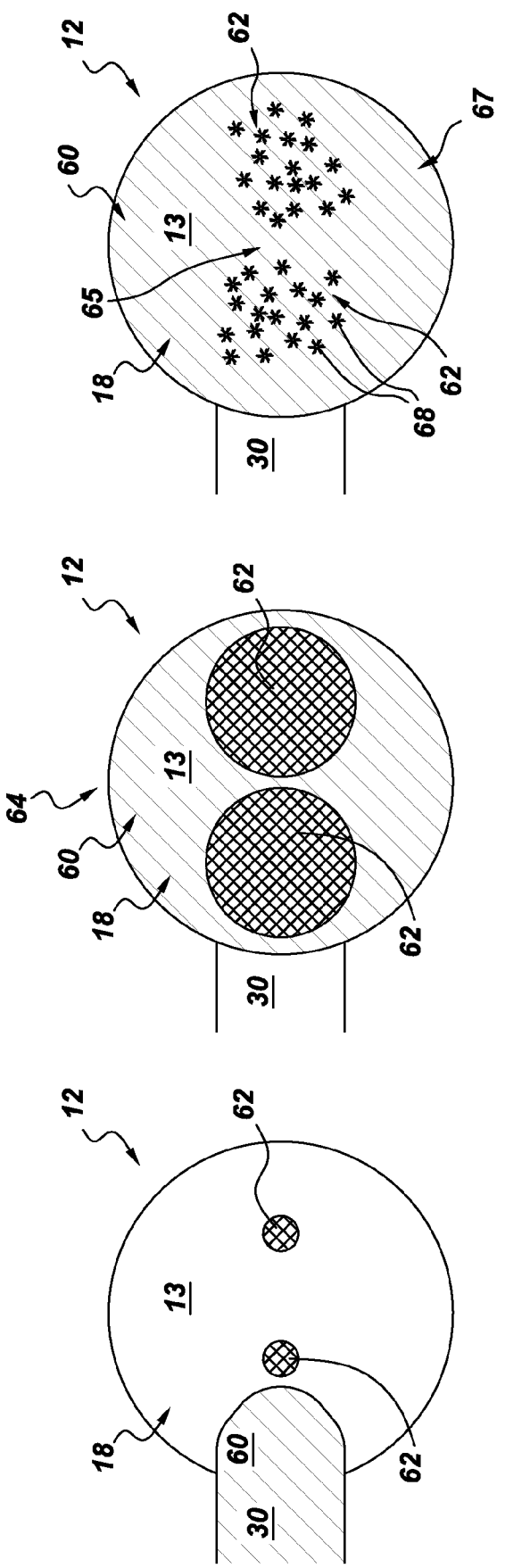

ENGINE AND METHOD OF OPERATING ENGINE

BACKGROUND

The present invention relates generally to the combustion in an engine and to associated methods.

Engine controls to delay ignition may include precise control of manifold temperature to control an in-cylinder ignition event; using fuel additives; adjusting the fuel lean/rich ratio; precise control of diesel injection timing and/or duration; controlling the compression of the gas using variable valve timing or variable compression ratios; and, adjusting an exhaust gas recirculation (EGR) rate.

In current engine systems that employ simultaneously natural gas and diesel fuels, the diesel fuel is injected into a natural gas/air mixture in a cylinder volume at the end of a compression stroke. The compression auto-combusts the injected diesel, and the diesel combustion creates a flame front that propagates from an injection point outward through the natural gas/air mixture to complete the total fuel combustion event.

Accordingly, it may be desirable to have an engine and a method of operating the engine that differs from those engines and methods that are currently available so as to improve, amongst other items, fuel efficiency and/or emissions.

BRIEF DESCRIPTION

The present invention includes embodiments that are directed to a strategy for operating an engine.

Therefore, in accordance with one aspect of the invention, a method comprises: introducing into a cylinder volume a first mixture comprising a first fuel and air, wherein the first fuel comprises a non-compression-combustible fuel; introducing into the cylinder volume a second fuel wherein the second fuel comprises a compression-combustible fuel; mixing the first mixture and the second fuel in the cylinder volume, such that the first mixture and the second fuel have a factor of homogeneity of at least about 0.5 in the cylinder volume; and compressing a piston in the cylinder volume, thereby compression combusting the second fuel.

In accordance with another aspect of the invention, a method comprises: introducing into a cylinder volume a non-compression-combustible fuel, a compression-combustible fuel, and an oxidant; and mixing the non-compression-combustible fuel, the compression-combustible fuel, and the oxidant for greater than about 275 microseconds, prior to compression combusting the compression-combustible fuel.

In accordance with another aspect of the invention, a method comprises combusting a mixture's first component in a first portion of a volume and a second portion of the volume at a substantially simultaneous time, wherein the first portion is disposed in a center region of the volume and the second portion is disposed radially outward from the first portion; and igniting the mixture's second component in response to the combusting of the first component such that each of the first portion of the second portion have a flame front that propagates towards the other.

In accordance with another aspect of the invention, a method comprises introducing a first mixture into a cylinder volume, wherein the first mixture comprises a first fuel and air, the first fuel comprising a non-compression-combustible fuel; injecting a second fuel into the cylinder volume, wherein the second fuel comprises a compression-combustible fuel; premixing the second fuel and the first mixture in the cylinder volume, thereby increasing the homogeneity of the second fuel and the first mixture; and igniting substantially simultaneously the second fuel via compression.

In accordance with another aspect of the invention, a method comprises injecting a compression-combustible fuel into a cylinder volume, the cylinder volume containing a non-compression-combustible fuel and an oxidant; and delaying a start of combustion at least about 275 microseconds after an end of the injecting the compression-combustible fuel into the cylinder volume.

In accordance with another aspect of the invention, a system comprises an engine; a cylinder disposed in the engine, thereby defining a cylinder volume; and a controller operable to inject a first fuel mixture into the cylinder volume and inject a second fuel to mix with the first fuel mixture in a range from about 25 to about 90 degrees before top dead center of a compression stroke.

In accordance with another aspect of the invention, a method comprises a means for introducing into a cylinder volume a first mixture comprising a first fuel and air, wherein the first fuel comprises a non-compression-combustible fuel; a means for introducing into the cylinder volume a second fuel wherein the second fuel comprises a compression-combustible fuel; a means for mixing the first mixture and the second fuel in the cylinder volume, such that the first mixture and the second fuel have a factor of homogeneity of at least about 0.5 in the cylinder volume; and a means for compressing a piston in the cylinder volume, thereby compression combusting the second fuel.

In accordance with another aspect of the invention, a method comprises a means for introducing into a cylinder volume a non-compression-combustible fuel, a compression-combustible fuel, and an oxidant; and a means for mixing the non-compression-combustible fuel, the compression-combustible fuel, and the oxidant for greater than about 275 microseconds, prior to compression combusting the compression-combustible fuel.

In accordance with another aspect of the invention, a method comprises a means for combusting a mixture's first component in a first portion of a volume and a second portion of the volume at a substantially simultaneous time, wherein the first portion is disposed in a center region of the volume and the second portion is disposed radially outward from the first portion; and a means for igniting the mixture's second component in response to the combusting of the first component such that each of the first portion of the second portion have a flame front that propagates towards the other.

In accordance with another aspect of the invention, a method comprises a means for introducing a first mixture into a cylinder volume, wherein the first mixture comprises a first fuel and air, the first fuel comprising a non-compression-combustible fuel; a means for injecting a second fuel into the cylinder volume, wherein the second fuel comprises a compression-combustible fuel; a means for premixing the second fuel and the first mixture in the cylinder volume, thereby increasing the homogeneity of the second fuel and the first mixture; and a means for igniting substantially simultaneously the second fuel via compression.

In accordance with another aspect of the invention, a method comprises a means for injecting a compression-combustible fuel into a cylinder volume, the cylinder volume containing a non-compression-combustible fuel and an oxidant; and a means for delaying a start of combustion at least about 275 microseconds after an end of the injecting the compression-combustible fuel into the cylinder volume.

Various other features and advantages of the present invention will be made apparent from the following detailed description and the drawings.

BRIEF DESCRIPTION OF THE DRAWINGS

The drawings illustrate one embodiment presently contemplated for carrying out the invention.

FIGS. 2A-2C are close-up plan views of a combustion chamber of an engine during certain times of the compression or combustion stroke, according to an embodiment of the present invention.

DETAILED DESCRIPTION

Figure 1A:
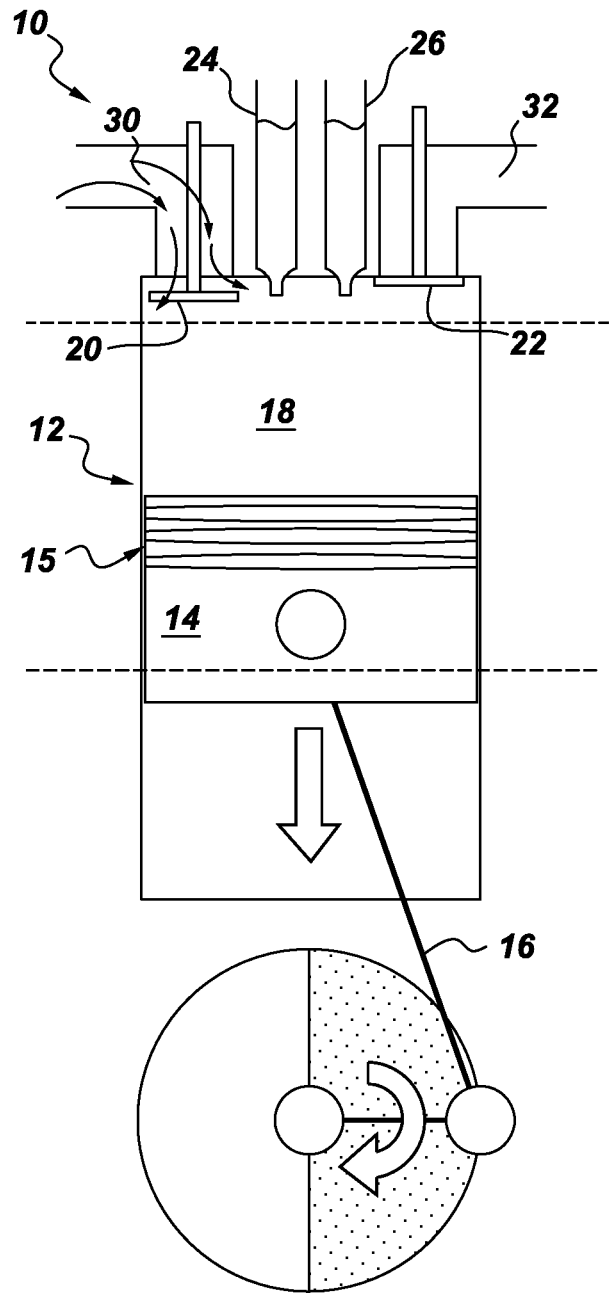
FIGS. 1A-1D are cross-sectional elevation views of a cylinder and piston arrangement showing various times of a four-stroke cycle of a reciprocating engine as used by aspects of the present invention.

The invention includes embodiments that relate to combustion in an engine and to associated methods.

As used herein, the term "compression-combustible fuel" means any single material or combination of materials that can spontaneously ignite or combust, without the aid of an ignition spark or flame, in a reciprocating engine cylinder during and/or immediately after a compression stroke of a piston therein.

As used herein, the term "non-compression-combustible fuel" means any single material or combination of materials that will not spontaneously ignite or combust, but will ignite or burn with the aid of an ignition spark or flame in a reciprocating engine cylinder.

As used herein, the term "combustion event" means the activities occurring when a fuel(s)/air mixture is ignited and/or burned, partially or entirely, in a combustion chamber of an engine, thereby producing heat, carbon dioxide, steam, and other chemicals, regardless of whether the event was via spark ignition and/or compression ignition.

As used herein, the term "homogeneity" means the degree or percentage that a mixture is substantially uniform with regards to the ratio(s) of molecules (e.g., air and fuel(s)) throughout a particular volume. By example only, a combustion chamber may exhibit substantial homogeneity when the ratios of air to fuels are substantially uniform throughout the combustion chamber. By example only, after introducing air, a first fuel, and a second fuel into the combustion chamber, they were mixed such that the degree of homogeneity of the components increased in the combustion chamber.

As used herein, the term "a factor of homogeneity" means the numeric amount or value, on a scale from 0 to 1, to which two or more components are mixed in a given, or stated, volume. A factor of homogeneity of zero (0) would exist at the instant of entry into a given volume of two, or more components, having no time to mix and/or pre-mix with each other, wherein the components were completely separate. A factor of homogeneity of one (1) would exist in a given volume if two, or more components, in the given volume were effectively fully mixed with each other. A factor of homogeneity of 0.5 would exist if in a given volume, for example, two components were partially mixed such that either the two components are fully mixed in about 50% volumetric portion of the given volume or on average across the entire given volume about 50% of the time there is full mixing of the two components. By example only, if a first fuel and air mixture are in a combustion chamber (i.e., given volume), after a sufficient period of time for mixing, the first fuel/air mixture has a factor of homogeneity of about 1. However, if a second fuel is introduced into the aforementioned combustion chamber (i.e., having first fuel and air therein), then at the instant after the introduction, the new mixture of the first fuel, air, and second fuel would have a factor of homogeneity of about 0. Similarly, if suitable means (e.g., mixing, premixing, etc.) is employed to the combustion chamber such that the first fuel, second fuel, and air are fully mixed, then the three-component mixture would have a factor of homogeneity of about 1.

As used herein, the term "premixing" means increasing the level, degree, and/or factor of homogeneity of two, or more, substances prior to an event. By example only, a mixture of air and a first fuel may be premixed with a second fuel prior to the combustion event such that the level or degree homogeneity of the air, first fuel, and second fuel has increased.

As used herein, the term "stoichiometric" means a fuel(s)/oxidant(s) mixture having exactly enough oxidant(s) required to convert all of the fuel(s) to primary combustion products (e.g., $CO_2$ and $H_2O$ for hydrocarbon fuels).

As used herein, the term "lean" means a fuel(s)/oxidant(s) mixture having more oxidant(s) than the amount of oxidant(s) required at the stoichiometric point for the particular mixture.

Aspects of the present invention have been shown to offer advantages over previous methodologies of combustion in a reciprocating engine. Aspects of the present invention provide a strategy for capitalizing on the flexibility enabled by a dual fuel reciprocating engine to enable precise control of a premixed combustion event in a reciprocating compression-ignition engine. In embodiments, natural gas may be premixed with fresh air and/or exhaust gas recirculation (EGR), while diesel is injected in the cylinder early during the compression stroke. In this manner, both the quantity of diesel and timing of the injection of diesel become control variable which facilitate precise control of the combustion event. Ultimately, the strategy offers several advantages including, for example, lower emissions (e.g., lower NOx emissions and lower particulate emissions), flex fuel capability, cheaper fuel, better control of the ignition event, and higher efficiency for reciprocating engines.

Figure 1B:
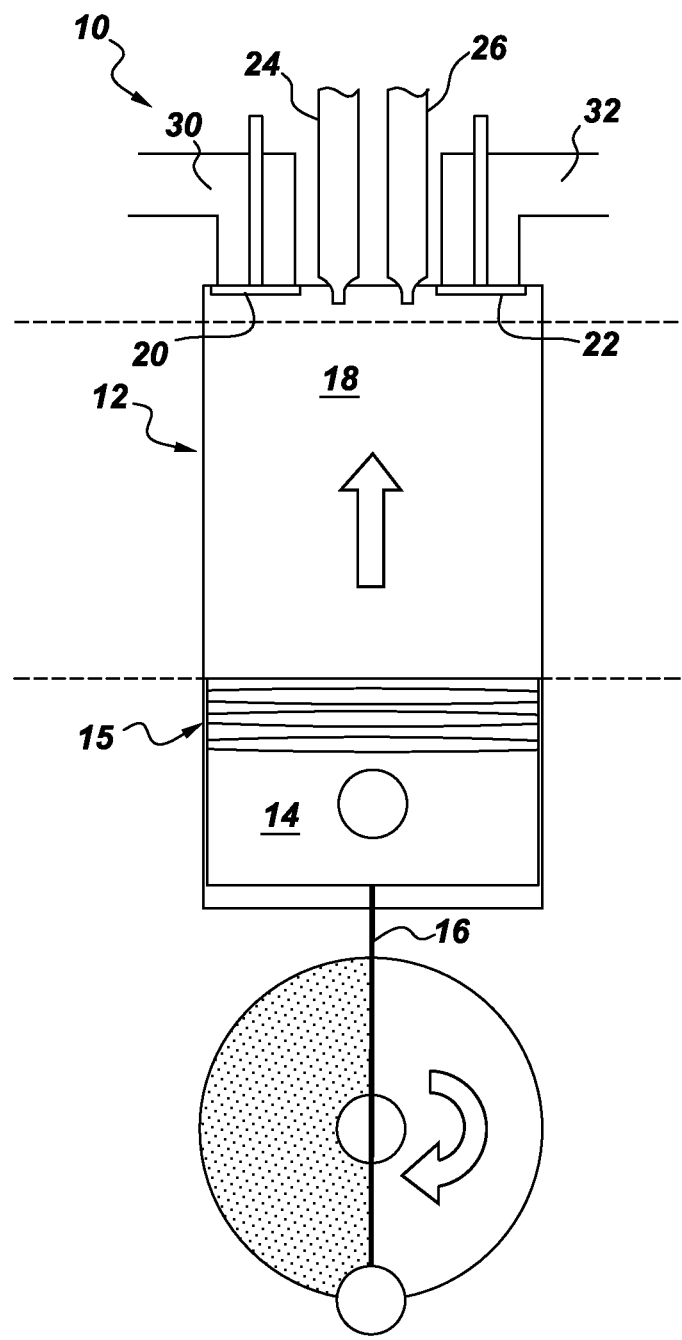
Figure 1C:
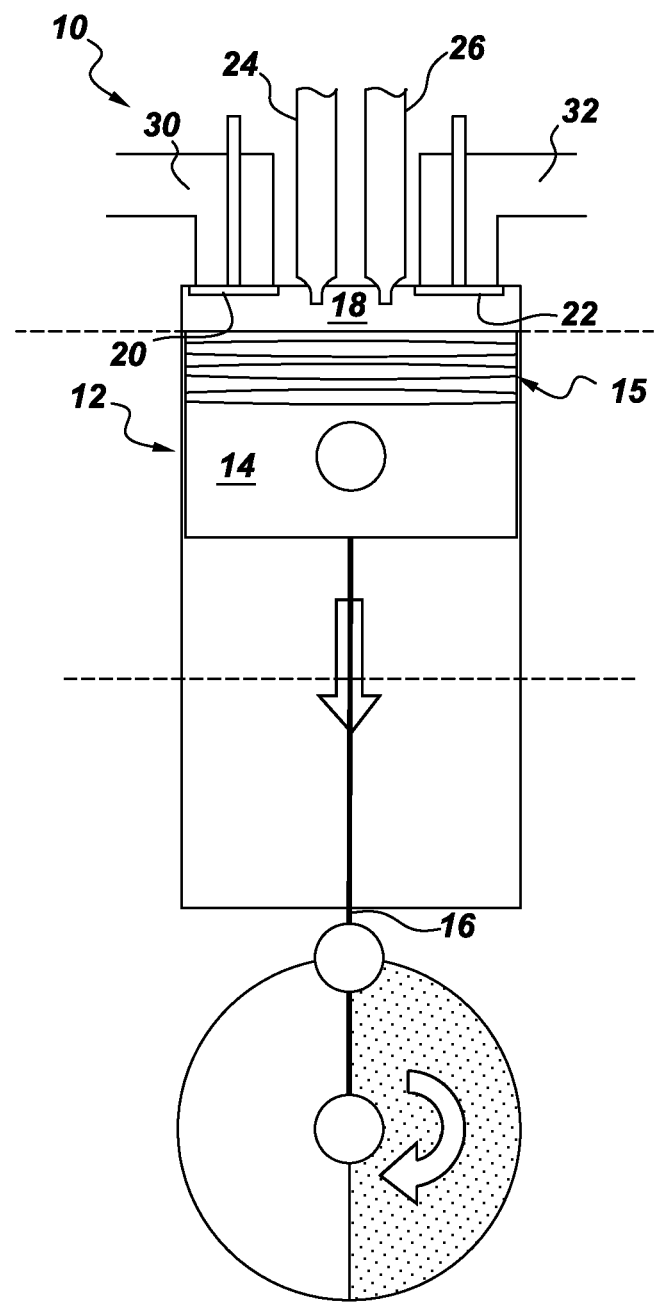
Figure 1D:
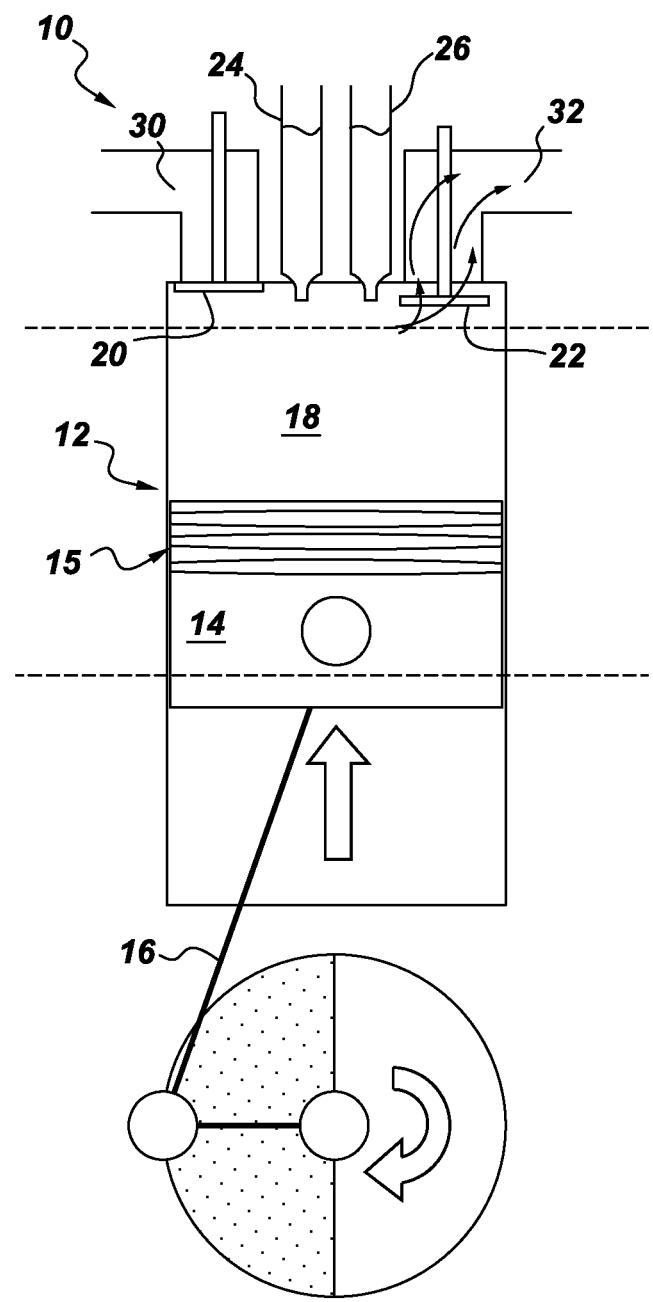

FIGS. 1A-1D depict a cross-sectional elevation view of an engine at four times during the four strokes of operation of the engine, according to aspects of the present invention. Specifically, FIG. 1A depicts a portion of intake stroke; FIG. 1B depicts the end of the intake stroke and start of compression stroke; FIG. 1C depicts a start of a power stroke; and, FIG. 1D depicts a portion of an exhaust stroke.

Common to all four figures, a system or engine 10 comprises a cylinder 12 having a piston 14 movably located therein. An intake runner or intake manifold 30 is in fluid communication with a combustion chamber or cylinder volume 18 as is an exhaust manifold 32. A series or plurality of valves (e.g., intake valve 20 and exhaust valve 22) actuate at certain times and for certain durations to open and close the fluid pathways between the cylinder volume 18 and the intake manifold 30 in the case of the intake valve 20 and the exhaust manifold 32 in the case of the exhaust valve 22.

The intake manifold 30 provides a pathway for an oxidant and at least one fuel to the cylinder volume 18. Similarly, the exhaust manifold 32 provides an egress pathway for all products of a combustion event that takes place in the cylinder volume 18. One or more injectors (e.g., first injector 24, second injector 26) are disposed so as to provide at least one fuel into the cylinder volume 18.

One or more piston rings 15 surround the piston 14 periphery and abut the wall of the cylinder 12 so as to aid in both reducing fuel/air mixture leakage between the piston 14 and the cylinder 12 wall out of the cylinder volume 18 and to reduce leakage of engine lubricants between the piston and the cylinder 12 wall up into the cylinder volume 18.

Other portions of the engine 10 shown schematically include a connecting rod 16 that is attached to the piston 14. The connecting rod 16 may be further connected to a transmission means including, for example, a crank shaft (not shown) so as to transmit the translational mechanical energy generated by the engine 10 into rotational energy for further use.

Referring to FIGS. 1A and 2A, an embodiment of the present invention wherein a first mixture 60 is introduced in a cylinder volume 18 during an intake stroke. The first mixture 60 comprises a first fuel and oxidant (e.g., air), wherein the first mixture 60 of first fuel and oxidant comprise a non-compression-combustible mixture. The first fuel being one of natural gas, ethanol, gasoline, syngas, biogas, ammonia, landfill gas, butanol, methanol, methane, hydrogen, industrial process gas, and combinations thereof. A second fuel 62, that comprises a compression-combustible fuel, such as diesel, is introduced into the cylinder volume 18 via one or more of the injectors 24, 26. The second fuel 62 may be a fuel other than gas.

As depicted for example in FIG. 2B, the first mixture 60 and the second fuel 62 are mixed together over time in the cylinder volume 18 so prior to any combustion in the cylinder volume 18 so that the degree of homogeneity of the first mixture 60 and the second fuel 62 increases. Subsequent to the mixing, the second fuel 62 is combusted or ignited via compression of the piston 14 (see e.g., FIGS. 1A-1D).

In an embodiment, the mixing of the first mixture 60 and the second fuel 62 in the cylinder volume 18 is done such that the first mixture 60 and the second fuel 62 have a factor of homogeneity of at least about 0.5 prior to compression combusting the second fuel 62. In another embodiment, the mixing of the first mixture 60 and the second fuel 62 in the cylinder volume 18 is done such that the first mixture 60 and the second fuel 62 have a factor of homogeneity of at least about 0.6 prior to compression combusting the second fuel 62. The mixing of the first mixture 60 and the second fuel 62 in the cylinder volume 18 is done such that the first mixture 60 and the second fuel 62 have a factor of homogeneity of at least about 0.75 prior to compression combusting the second fuel 62. In another embodiment, the mixing of the first mixture 60 and the second fuel 62 in the cylinder volume 18 is done such that the first mixture 60 and the second fuel 62 have a factor of homogeneity of at least about 0.9 prior to compression combusting the second fuel 62.

In an embodiment, the introduction of the second fuel 62 into the cylinder volume 18 may be done by injecting, for example, by the first injector 24 (see e.g., FIG. 1B) into the cylinder volume 18 when a corresponding piston 14 position is in a range from about 25 to about 90 degrees before top-dead-center of a compression stroke. In another embodiment, the second fuel 62 may be injected into the cylinder volume 18 when a corresponding piston 14 position is in a range from about 35 to about 80 degrees before top-dead-center of a compression stroke. In another embodiment, the second fuel 62 may be injected into the cylinder volume 18 when a corresponding piston 14 position is in a range from about 45 to about 70 degrees before top-dead-center of a compression stroke. In another embodiment, the second fuel 62 may be injected into the cylinder volume 18 when a corresponding piston 14 position is in a range from about 55 to about 60 degrees before top-dead-center of a compression stroke.

Referring in general to FIGS. 2B and 2C, the compression combustion of the second fuel 62 throughout the cylinder volume 18 in an embodiment thereby causes the first mixture 60 to ignite so that a first portion 65 of the first mixture 60 which is disposed at a center portion of the cylinder volume 18 is ignited substantially simultaneously as a second portion 67 of the first mixture 60 disposed at an outer edge of the cylinder volume 18.

In various embodiments, the method further comprises controlling an amount and/or a timing of the second fuel 62 entering the combustion volume 18. In this manner, various aspects of the combustion event may be controlled including knock, intensity of the combustion event, phasing of the combustion event, retard or advance of the combustion event, and combinations thereof.

In an embodiment, the method further comprises vaporizing at least a portion of the second fuel 62 before the piston 14 reaches a second top position (see e.g., FIG. 1C).

In an embodiment, the first mixture (e.g., oxidant and non-compression-combustible fuel) may be premixed prior introduction of the first mixture into the cylinder volume 18. The premixing may take place in the intake manifold 30.

In an embodiment, the introduction into the cylinder volume 18 of the second fuel 62 (e.g., diesel) may comprise injecting diesel via an injector (24 and/or 26) in a pattern wherein the pattern is narrower than a width of the cylinder 18. In this manner, the second fuel 62 is less apt to migrate fully to the absolute periphery of the piston 14 thereby mitigating wear of the ring(s) 15 (see e.g., FIG. 1A).

In an embodiment, the method may further comprise diluting the first mixture 60. The first mixture 60 may further comprise a diluent comprising one of exhaust gas, water, nitrogen, carbon dioxide, argon, helium, and combinations thereof.

In another embodiment of the method, a non-compression-combustible fuel, a compression-combustible fuel 62, and an oxidant are introduced into the cylinder volume 18. The introduced components are then mixed in the cylinder volume 18 for a period of time prior to the compression combustion of the compression-combustible fuel. The mixing may be conducted during a portion the intake and compression strokes of the piston 14. The period of time may be suitable so as to adequately increase the homogeneity of the components in the cylinder volume 18.

In an embodiment, the time period for mixing of the non-compression-combustible fuel, the compression-combustible fuel 62, and the oxidant may be greater than about 250 microseconds. In another embodiment, the time period for mixing of the non-compression-combustible fuel, the compression-combustible fuel 62, and the oxidant may be greater than about 275 microseconds. In another embodiment, the time period for mixing of the non-compression-combustible fuel, the compression-combustible fuel 62, and the oxidant may be greater than about 300 microseconds. In another embodiment, the time period for mixing of the non-compression-combustible fuel, the compression-combustible fuel 62, and the oxidant may be greater than about 325 microseconds.

In an embodiment, the method may further comprise controlling the timing of the introduction one or more of the three components (i.e., non-compression-combustible fuel, compression-combustible fuel 62, and oxidant) in relation to top-dead-center of the compression stroke (or start of power stroke) (see e.g., FIG. 1C). The controlling may be provided by a combination of means including cam lobe design, fuel injection timing design, and the like.

In an embodiment, the method may further comprise controlling a ratio of the non-compression-combustible fuel relative to the compression-combustible fuel. In another embodiment, the method may further comprise controlling the absolute quantities of the non-compression-combustible fuel and/or the compression-combustible fuel that are introduced into the cylinder volume 18. In still another embodiment, the method further comprises controlling the amount of oxidant introduced into the cylinder volume 18. The oxidant control may be done by controlling the air component introduced; adding exhaust gas; and/or adding a diluent into the control volume 18.

Referring to FIGS. 2B and 2C, an embodiment of the method comprises combusting a mixture wherein the plurality of ignition or combustion locations are distributed throughout a larger portion of the cylinder volume 18, as depicted by numeral 68 in FIG. 2C. The method may comprise combusting a mixture's first component in a volume (e.g., cylinder volume 18) wherein a first portion of the mixture is in a center region of the volume and the second portion of the mixture is disposed radially outward from the first portion. The combustion of the first component in the at least two portions is done substantially simultaneously. For example, in the case of a cylinder volume 18 combustion of the first component (e.g., diesel) of the mixture may take place simultaneously both in a center of the cylinder volume 18 and at or near the periphery of the cylinder volume 18 (e.g., near the cylinder wall). In response to the combusting of the first component of the mixture, a second component (e.g., non-compression-combustible fuel 60) of the mixture is ignited. In this manner, a flame propagates between the first portion and the second portion of the volume and could be considered substantially omnidirectional.

In an embodiment, any flame or flame front does not radiate outward from an injection location(s) of the first component. For example, referring to FIGS. 1A-1D and 2C the flame propagation from ignition points 68 towards the second component (e.g., non-compression-combustible fuel 70) does not propagate outward from the injectors (24, 26).

In an embodiment a method comprises introducing a first mixture into a cylinder volume 18 wherein the first comprises a non-compression-combustible fuel and air. A second fuel is injected into the cylinder volume, wherein the second fuel is a compression-combustible fuel. The first mixture and the second fuel are premixed in the cylinder volume 18 such that the homogeneity of the second fuel and the first mixture increases. In this manner, the first mixture and second fuel expand into the cylinder volume 18. The second fuel is ignited, via compression, substantially simultaneously.

In an embodiment, the first mixture (i.e., non-compression-combustible fuel and air) upon entering the cylinder volume 18 is substantially lean. Similarly, the premixture after being premixed, and immediately prior to compression combustion of the second fuel, may be substantially lean in an embodiment. In an embodiment, the degree or amount of leanness of the premixture is non-uniform across the cylinder volume 18. For example, in the center portion of the cylinder volume 18 adjacent to the injector 24, 26 locations the premixture may be less lean than the premixture in the portion distal to the injector 24, 26 locations (e.g., periphery of the cylinder). In other words, the premixture is leaner in the location(s) furthest from the injection 24, 26 locations.

In an embodiment, the second fuel 62 (e.g., diesel) is ignited in a plurality of ignition locations 68 (see e.g., FIG. 2C) in the cylinder volume 18 substantially simultaneously. As a result of the autoignition of the second fuel 62 in the plurality of ignition locations 68, the first fuel in the premixture is similarly ignited by the adjacent ignited second fuel 62.

In an embodiment, the premixture may be substantially homogeneous in the cylinder volume 18. Similarly, in another embodiment, the premixture may have an increased homogeneity over the first mixture and second fuel upon entering the cylinder volume 18 but less than being substantially homogeneous throughout the cylinder volume 18.

In an embodiment, a method may comprise injecting a compression-combustible fuel 62 into a cylinder volume 18 that contains a non-compression fuel 60 and an oxidant and then delaying a start of combustion at least about 275 microseconds after the end of the injection of the compression-combustible fuel 62. In this manner, premixing of the at least two fuels is afforded, thereby increasing homogeneity, prior to combustion.

In another embodiment, any of the methods employed herein may delay the start of combustion within the cylinder volume by employing one, or more, of the following: increasing exhaust gas recirculation, increasing diluent, increasing air-to-fuel ratio, reducing manifold air temperature, advancing injection timing, injecting water, reducing a quantity of the compression-combustible fuel, reducing geometric compression ratio, reducing effective compression using variable valve timing, and the like.

Therefore, according to one embodiment of the present invention, a method comprises: introducing into a cylinder volume a first mixture comprising a first fuel and air, wherein the first fuel comprises a non-compression-combustible fuel; introducing into the cylinder volume a second fuel wherein the second fuel comprises a compression-combustible fuel; mixing the first mixture and the second fuel in the cylinder volume, such that the first mixture and the second fuel have a factor of homogeneity of at least about 0.5 in the cylinder volume; and compressing a piston in the cylinder volume, thereby compression combusting the second fuel.

In accordance with another aspect of the invention, a method comprises: introducing into a cylinder volume a non-compression-combustible fuel, a compression-combustible fuel, and an oxidant; and mixing the non-compression-combustible fuel, the compression-combustible fuel, and the oxidant for greater than about 275 microseconds, prior to compression combusting the compression-combustible fuel.

In accordance with another aspect of the invention, a method comprises combusting a mixture's first component in a first portion of a volume and a second portion of the volume at a substantially simultaneous time, wherein the first portion is disposed in a center region of the volume and the second portion is disposed radially outward from the first portion; and igniting the mixture's second component in response to the combusting of the first component such that each of the first portion of the second portion have a flame front that propagates towards the other.

In accordance with another aspect of the invention, a method comprises introducing a first mixture into a cylinder volume, wherein the first mixture comprises a first fuel and air, the first fuel comprising a non-compression-combustible fuel; injecting a second fuel into the cylinder volume, wherein the second fuel comprises a compression-combustible fuel; premixing the second fuel and the first mixture in the cylinder volume, thereby increasing the homogeneity of the second fuel and the first mixture; and igniting substantially simultaneously the second fuel via compression.

In accordance with another aspect of the invention, a method comprises injecting a compression-combustible fuel into a cylinder volume, the cylinder volume containing a non-compression-combustible fuel and an oxidant; and delaying a start of combustion at least about 275 microseconds after an end of the injecting the compression-combustible fuel into the cylinder volume.

In accordance with another aspect of the invention, a system comprises an engine; a cylinder disposed in the engine, thereby defining a cylinder volume; and a controller operable to inject a first fuel mixture into the cylinder volume and inject a second fuel to mix with the first fuel mixture in a range from about 25 to about 90 degrees before top dead center of a compression stroke.

In accordance with another aspect of the invention, a method comprises a means for introducing into a cylinder volume a first mixture comprising a first fuel and air, wherein the first fuel comprises a non-compression-combustible fuel; a means for introducing into the cylinder volume a second fuel wherein the second fuel comprises a compression-combustible fuel; a means for mixing the first mixture and the second fuel in the cylinder volume, such that the first mixture and the second fuel have a factor of homogeneity of at least about 0.5 in the cylinder volume; and a means for compressing a piston in the cylinder volume, thereby compression combusting the second fuel.

In accordance with another aspect of the invention, a method comprises a means for introducing into a cylinder volume a non-compression-combustible fuel, a compression-combustible fuel, and an oxidant; and a means for mixing the non-compression-combustible fuel, the compression-combustible fuel, and the oxidant for greater than about 275 microseconds, prior to compression combusting the compression-combustible fuel.

In accordance with another aspect of the invention, a method comprises a means for combusting a mixture's first component in a first portion of a volume and a second portion of the volume at a substantially simultaneous time, wherein the first portion is disposed in a center region of the volume and the second portion is disposed radially outward from the first portion; and a means for igniting the mixture's second component in response to the combusting of the first component such that each of the first portion of the second portion have a flame front that propagates towards the other.

In accordance with another aspect of the invention, a method comprises a means for introducing a first mixture into a cylinder volume, wherein the first mixture comprises a first fuel and air, the first fuel comprising a non-compression-combustible fuel; a means for injecting a second fuel into the cylinder volume, wherein the second fuel comprises a compression-combustible fuel; a means for premixing the second fuel and the first mixture in the cylinder volume, thereby increasing the homogeneity of the second fuel and the first mixture; and a means for igniting substantially simultaneously the second fuel via compression.

In accordance with another aspect of the invention, a method comprises a means for injecting a compression-combustible fuel into a cylinder volume, the cylinder volume containing a non-compression-combustible fuel and an oxidant; and a means for delaying a start of combustion at least about 275 microseconds after an end of the injecting the compression-combustible fuel into the cylinder volume.

The present invention has been described in terms of the preferred embodiment, and it is recognized that equivalents, alternatives, and modifications, aside from those expressly stated, are possible and within the scope of the appending claims.

What is claimed is:

1. A method comprising:
    introducing into a cylinder volume a first mixture comprising a first fuel and air, wherein the first fuel comprises a non-compression-combustible fuel;
    introducing into the cylinder volume a second fuel wherein the second fuel comprises a compression-combustible fuel;
    mixing the first mixture and the second fuel in the cylinder volume, such that the first mixture and the second fuel have a factor of homogeneity of at least about 0.5 in the cylinder volume; and
    compressing a piston in the cylinder volume, thereby compression combusting the second fuel.

2. The method of claim 1, wherein the second fuel comprises diesel.

3. The method of claim 1, wherein the introducing into the cylinder volume a second fuel comprises injecting into the cylinder volume when a corresponding piston position is in a range from about 25 to about 90 degrees before top-dead-center of a compression stroke.

4. The method of claim 1, further comprising combusting the second fuel throughout the cylinder volume and thereby to ignite the first mixture so that a first portion of the first mixture disposed at a center portion of the cylinder volume is ignited substantially simultaneously as a second portion of the first mixture disposed at an outer region of the cylinder volume.

5. The method of the claim 1, further comprising controlling an amount of the second fuel entering the cylinder volume, and thereby controlling knock.

6. The method of claim 1, further comprising controlling a timing of the second fuel entering the cylinder volume, and thereby controlling at least one of an intensity of a combustion event and phasing of the combustion event.

7. The method of claim 1, further comprising controlling a timing of the second fuel entering the cylinder volume, and thereby retarding a combustion event in the cylinder volume.

8. The method of claim 1, further comprising controlling a timing of the second fuel entering the cylinder volume, and thereby advance a combustion event in the cylinder volume.

9. The method of claim 1, further comprising vaporizing at least a portion of the second fuel before the piston reaches a top dead center position.

10. The method of claim 1, further comprising vaporizing all of the second fuel before the combustion event begins.

11. The method of claim 1 wherein the first fuel comprises natural gas.

12. The method of claim 1, wherein the first fuel comprises one of ethanol, gasoline, syngas, biogas, ammonia, landfill gas, butanol, methanol, methane, hydrogen, industrial process gas, and combinations thereof.

13. The method of claim 1, further comprising premixing the first mixture in an intake manifold.

14. The method of claim 1, wherein introducing into a cylinder volume a second fuel further comprises injecting diesel in a pattern, wherein the pattern is narrower than a width of the cylinder.

15. The method of claim 1, further comprising diluting the first mixture.

16. The method of claim 15, wherein the diluent comprises one of exhaust gas, water, nitrogen, carbon dioxide, argon, helium, and combinations thereof.

17. The method of claim 1, further comprising delaying a start of a combustion by at least one of increasing exhaust gas recirculation, increasing diluent, increasing air-to-fuel ratio, reducing manifold air temperature, advancing injection timing, injecting water, reducing a quantity of the second fuel, reducing geometric compression ratio, and reducing effective compression using variable valve timing.

18. A method comprising:
    introducing into a cylinder volume a non-compression-combustible fuel, a compression-combustible fuel, and an oxidant; and
    mixing the non-compression-combustible fuel, the compression-combustible fuel, and the oxidant for greater than about 275 microseconds, prior to compression combusting the compression-combustible fuel.

19. The method of claim 18, wherein the mixing is greater than about 300 microseconds.

20. The method of claim 19, wherein the mixing is greater than about 325 microseconds.

21. The method of claim 18, further comprising controlling the timing of the introducing relative to top dead center of a compression stroke.

22. The method of claim 18, further comprising controlling a ratio of the non-compression-combustible fuel relative to the compression-combustible fuel.

23. The method of claim 18, further comprising controlling an amount of the oxidant.

24. The method of claim 23, wherein the controlling comprises at least one of controlling an air component, adding an exhaust gas, and adding a diluent.

25. The method of claim 18, further comprising delaying a start of a combustion by at least one of increasing exhaust gas recirculation, increasing air-to-fuel ratio, reducing manifold air temperature, advancing injection timing, injecting water, reducing a quantity of the compression-combustible fuel, reducing geometric compression ratio, and reducing effective compression using variable valve timing.

26. A method comprising:
injecting a compression-combustible fuel into a cylinder volume, the cylinder volume containing a non-compression-combustible fuel and an oxidant; and
delaying a start of combustion at least about 275 microseconds after an end of the injecting the compression-combustible fuel into the cylinder volume.

27. The method of claim 26, wherein the delaying a start of combustion is at least partially by at least one of increasing exhaust gas recirculation, increasing air-to-fuel ratio, reducing manifold air temperature, advancing injection timing, injecting water, reducing a quantity of the second fuel, reducing geometric compression ratio, and reducing effective compression using variable valve timing.

28. A method comprising:
a means for introducing into a cylinder volume a first mixture comprising a first fuel and air, wherein the first fuel comprises a non-compression-combustible fuel;
a means for introducing into the cylinder volume a second fuel wherein the second fuel comprises a compression-combustible fuel;
a means for mixing the first mixture and the second fuel in the cylinder volume, such that the first mixture and the second fuel have a factor of homogeneity of at least about 0.5 in the cylinder volume; and
a means for compressing a piston in the cylinder volume, thereby compression combusting the second fuel.

29. A method comprising:
a means for introducing into a cylinder volume a non-compression-combustible fuel, a compression-combustible fuel, and an oxidant; and
a means for mixing the non-compression-combustible fuel, the compression-combustible fuel, and the oxidant for greater than about 275 microseconds, prior to compression combusting the compression-combustible fuel.

* * * * *